US008175596B1

(12) United States Patent
Mansour et al.

(10) Patent No.: US 8,175,596 B1
(45) Date of Patent: May 8, 2012

(54) SYSTEM AND METHOD OF EXTENDING BASE STATION COVERAGE

(75) Inventors: Nagi A. Mansour, Arlington, VA (US);
Rajesh M. Gangadhar, Ashburn, VA (US); Matthew Starzec, Fairfax, VA (US); Petronilo Cailipan, Briston, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 971 days.

(21) Appl. No.: 12/170,481

(22) Filed: Jul. 10, 2008

(51) Int. Cl.
*H04W 4/00* (2009.01)
*H04B 7/00* (2006.01)
*H04B 7/14* (2006.01)

(52) U.S. Cl. ............. 455/435.1; 455/41.2; 370/315; 370/328; 370/338

(58) Field of Classification Search ............ 455/435.1, 455/41.2; 370/315, 328, 338
See application file for complete search history.

(56) References Cited

U.S. PATENT DOCUMENTS

| | | | |
|---|---|---|---|
| 5,850,593 A | 12/1998 | Uratani | |
| 7,010,325 B1 * | 3/2006 | Oh | 455/557 |
| 7,092,434 B2 * | 8/2006 | Moon et al. | 375/211 |
| 7,110,715 B2 | 9/2006 | Gupta | |
| 2004/0071122 A1 * | 4/2004 | Svensson et al. | 370/338 |
| 2004/0121766 A1 * | 6/2004 | Benson et al. | 455/425 |
| 2006/0040670 A1 * | 2/2006 | Li et al. | 455/445 |
| 2006/0256728 A1 | 11/2006 | Li et al. | |
| 2007/0280172 A1 * | 12/2007 | Tan et al. | 370/335 |
| 2007/0291670 A1 * | 12/2007 | Pettersson et al. | 370/310 |
| 2008/0279182 A1 * | 11/2008 | Hafeez et al. | 370/389 |
| 2009/0141676 A1 * | 6/2009 | Maheshwari et al. | 370/329 |
| 2009/0146838 A1 * | 6/2009 | Katz | 340/870.02 |
| 2009/0207778 A1 * | 8/2009 | Wang et al. | 370/315 |
| 2010/0039947 A1 * | 2/2010 | Li et al. | 370/252 |

* cited by examiner

*Primary Examiner* — Christopher M Brandt
(74) *Attorney, Agent, or Firm* — Crowell & Moring LLP

(57) ABSTRACT

Systems and methods of extending base station coverage are provided. Idle mode mobile stations supported by a base station are identified, and at least one of the idle mode mobile stations is selected based on a location of the at least one idle mode mobile station. A communication with an active mode mobile station that is associated with the at least one idle mode mobile station is established. The active mode mobile station is not able to directly receive communications from the base station, and the identification and selection of idle mode mobile stations and the establishment of the communication are performed by the base station.

12 Claims, 4 Drawing Sheets

SYSTEM AND METHOD OF EXTENDING BASE STATION COVERAGE

BACKGROUND OF THE INVENTION

Wireless macro communication networks are typically composed of a number of base stations, each base station including a coverage area commonly referred to as a cell. The size of the coverage area of a cell is influenced by a number of factors, including transmission power, pathloss, interference, and/or the like. Base stations are typically arranged such that the coverage areas of adjacent cells have a small area of overlap, which allows for handover from one base station to the next.

SUMMARY OF THE INVENTION

Although cells theoretically have a uniform coverage area, in practice the coverage area may be larger in some parts of a cell than others. Thus, due to interference and/or obstructions, portions of a cell may not actually overlap with portions of an adjacent cell. Moreover, base station placement depends upon a number of factors, including allocation of frequencies by government bodies, the ability to acquire a location for the base station and/or zoning regulations. Accordingly, wireless communication networks can include areas that do not have sufficient coverage provided by base stations.

Systems and methods of extending base station coverage are provided. Idle mode mobile stations supported by a base station are identified, and at least one of the idle mode mobile stations is selected based on a location of the at least one idle mode mobile station. A communication with an active mode mobile station that is associated with the at least one idle mode mobile station is established. The active mode mobile station is not able to directly receive communications from the base station, and the identification and selection of idle mode mobile stations and the establishment of the communication are performed by the base station.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
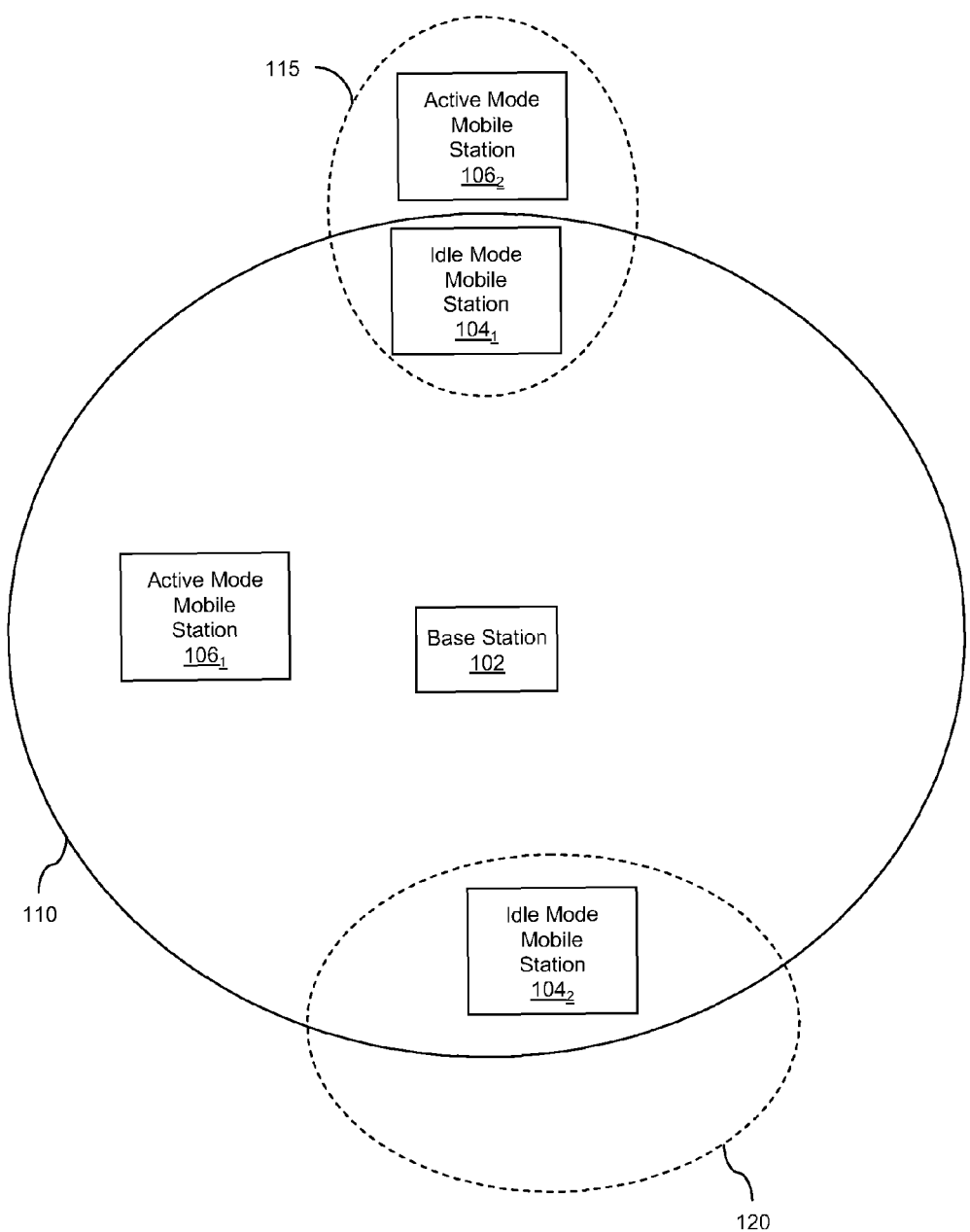
FIG. 1 is a block diagram of an exemplary system in accordance with the present invention.

FIG. 1 is a block diagram of an exemplary system in accordance with the present invention. The system includes base station 102, idle mode mobile stations $104_1$ and $104_2$, and active mode mobile stations $106_1$ and $106_2$. Base station 102 provides a coverage area 110, idle mode mobile station $104_1$ provides coverage area 115 and idle mode mobile station $104_2$ provides coverage area 120. In accordance with exemplary embodiments of the present invention, base station 102 selects one or more idle mode mobile stations to extend the base station's coverage area in order to support communications with active mode mobile stations located outside of the base station's coverage area. In FIG. 1, active mode mobile station $106_2$ is located outside of coverage area 110 of base station 102, however, base station 102 employs idle mode mobile station $104_1$ as a repeater to provide communications between base station 102 and active mode mobile station $106_2$.

Although the system of FIG. 1 illustrates two idle mode mobile stations and two active mode mobile stations, the present invention is equally applicable to systems that include more or less of either of these types of mobile stations. Furthermore, coverage areas 110, 115 and 120 are nearly exemplary, and these coverage areas can be different sizes and/or shapes from that illustrated in FIG. 1.

Figure 2A:
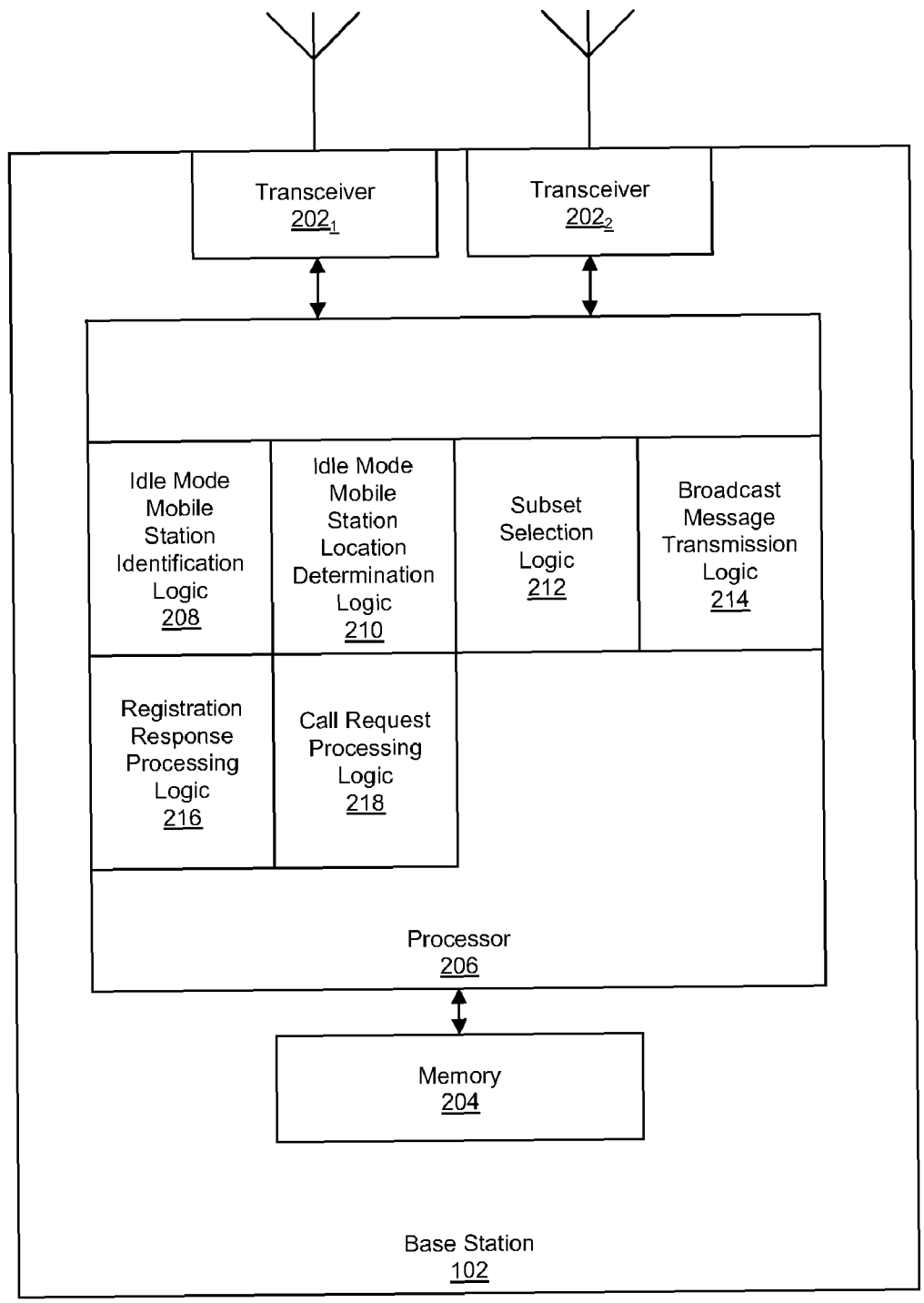
FIG. 2A is a block diagram of an exemplary base station in accordance with the present invention.

FIG. 2A is a block diagram of an exemplary base station in accordance with the present invention. Base station 102 includes processor 206 coupled between memory 204 and transceivers $202_1$ and $202_2$. Transceivers $202_1$ and $202_2$ are each respectively coupled to an antenna. Processor 206 includes logic 208 through 218, which will be described in more detail below in connection with FIG. 3. Processor 206 can be any type of processor, such as a field programmable gate array (FPGA), application specific integrated circuit (ASIC), and/or a microprocessor. When processor 206 is a microprocessor, logic 208 through 218 can be computer executable instructions that are loaded from a computer readable medium, such as memory 204. Memory 204 can be any type of memory, including random access memory (RAM), read only memory (ROM), flash memory, a hard disk, a CD, a DVD, and/or the like.

Figure 2B:
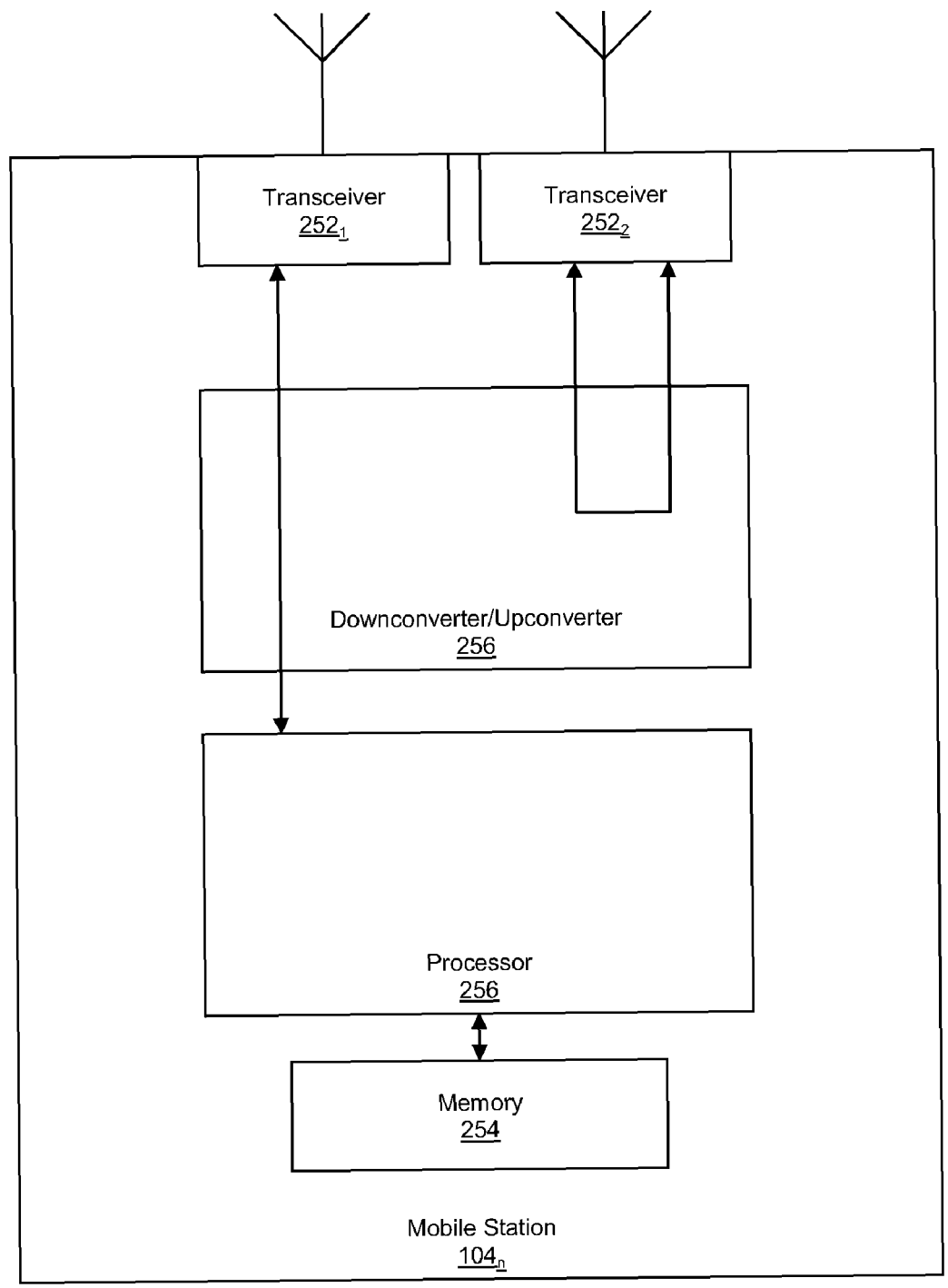
FIG. 2B is a block diagram of an exemplary idle mode mobile station in accordance with the present invention.

FIG. 2B is a block diagram of an exemplary idle mode mobile station in accordance with the present invention. Mobile station $104_n$ includes a processor 256 coupled to memory 254. Processor 256 and memory 254 can be any type of processor and memory, such as those discussed above in connection with base station 102. Processor 256 is coupled to transceiver $252_1$ via downconverter/upconverter 256, in order to exchange communications with a base station that originate from, or are destined to, an active mode mobile station located outside of the base station's coverage area. Transceiver $252_2$ is coupled to downconverter/upconverter 256 in order to repeat communications between a base station and an active mode mobile station. Although not illustrated, mobile station $104_n$ can include additional elements, such as a power amplifier for amplifying communications transmitted by the mobile station either to the base station or to an active mode mobile station.

Figure 3:
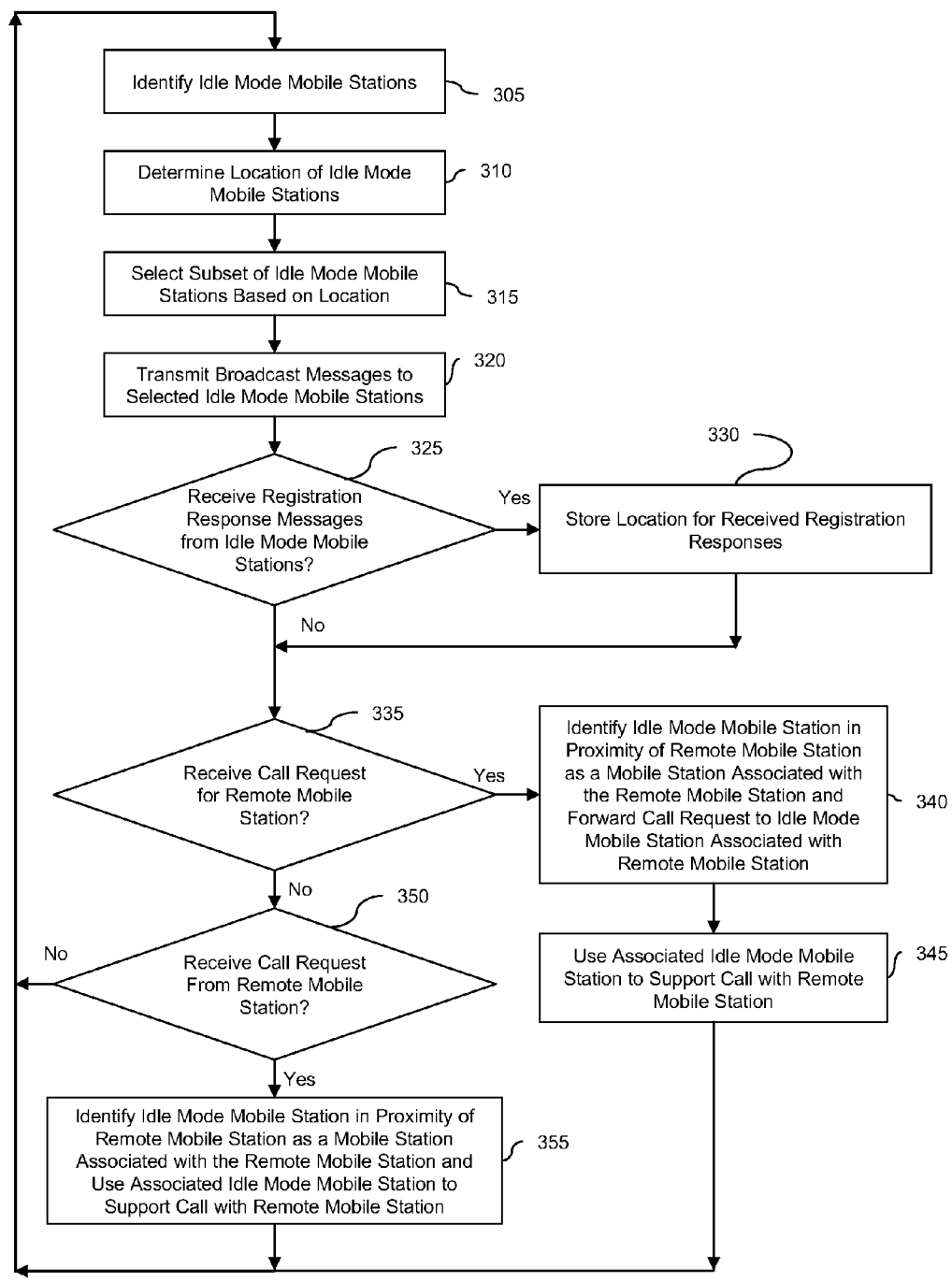
FIG. 3 is a flow diagram of an exemplary method in accordance with the present invention.

FIG. 3 is a flow diagram of an exemplary method in accordance with the present invention. Initially, logic 208 of base station 102 identifies idle mode mobile stations, such as idle mode mobile stations $104_1$ and $104_2$ (step 305). Logic 210 then determines the location of the identified idle mode mobile stations (step 310). The location of the idle mode mobile stations can be identified in any number of ways, such as based on Global Positioning Satellite (GPS) information, the sector in which the idle mode mobile station is located, and/or using pathloss and/or transmission power values to determine the distance of the idle mode mobile station from the base station.

Logic 212 selects a subset of the idle mode mobile stations based upon location (step 315), and logic 214 transmits broadcast messages to the selected idle mode mobile stations (step 320). Specifically, in order to reduce interference, the base station does not employ all idle mode mobile stations as repeaters. Thus, if a number of idle mode mobile stations are situated within a similar location, only one or two of the mobile stations may be selected by the base station. Moreover, as will be described below, the base station identifies the location of active mode mobile stations that are located outside of the base station's coverage area. Accordingly, after such active mode mobile stations are identified and the process returns to step 305, the subset of idle mode mobile stations can include those idle mode mobile stations located in proximity to the active mode mobile station. The broadcast messages can be any type of conventional broadcast messages, such as messages used for identifying a base station to allow a mobile station to register with the base station. The broadcast messages are received by mobile station $104_n$ via transceiver $252_2$ and rebroadcast such that an active mode mobile station located outside of the base station's coverage area can exchange communications with the base station.

Logic 216 determines whether the base station has received any registration responses from idle mode mobile stations (step 325). These registration response messages can be received by the base station via one of the selected idle mode mobile stations. When logic 216 determines that registration responses have been received ("Yes" path out of decision step 325), then logic 216 examines the response message in order to store the location of the active mode mobile station that originally sent the registration response message (step 330). The registration response message will include some type of location information, such as GPS information. If a registration response has not been received ("No" path out of decision step 325), or after storing the location of the active mode mobile station from a received registration response (step 330), then logic 218 determines whether the base station has received a call request for a remote mobile station (step 335). The call request can originate from a mobile station located within the cell of the base station, or can be received from the infrastructure network from another mobile station or a landline station.

When logic 218 determines that a call request is received ("Yes" path out of decision step 335), then logic 218 identifies an idle mode mobile station in proximity of the active mode mobile station to which the call request is intended as an associated mobile station, forwards the call request to the idle mode mobile station associated with the remote station and uses the associated idle mode mobile station to support a call between base station 102 and the remote mobile station (steps 340 and 345). Specifically, referring now to FIG. 2B, the call request will be forwarded to mobile station $104_n$, which will be received by transceiver $252_2$, downconverted and upconverted by downconverter/upconverter 256, and amplified (if necessary) prior to transmission to the remote active mode mobile station, and communications between the active mode mobile station and the base station will follow similar processing.

When, however, a call request for a remote mobile station has not been received ("No" path out of decision step 335), then logic 218 determines whether it has received a call request from a remote mobile station associated with an idle mode mobile station (step 350). Idle mode mobile station $104_n$ will receive the call request from the active mode mobile station by transceiver $252_2$, downconvert and upconvert the received request using downconverter/upconverter 256, amplify the request (if necessary) and transmit the call request to base station 102 using transceiver $252_2$.

When base station 102 receives a call request from a remote mobile station via an idle mode mobile station ("Yes" path out of decision step 350), then logic 218 identifies an idle mode mobile station in proximity of the active mode mobile station to which the call request originated as an associated mobile station and uses the associated idle mode mobile station to support a call with the remote mobile station (step 355). It should be recognized that the idle mode mobile station that forwarded the call request may not necessarily be the one that is identified as the associated mobile station. When a call request is not received from a remote mobile station ("No" path out of decision step 350) or after steps 345 and 355, processing returns to step 305 in order to identify idle mode mobile stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising the acts of:
    identifying idle mode mobile stations supported by a base station;
    selecting at least one of the idle mode mobile stations based on a location of the at least one idle mode mobile station;
    transmitting, by the base station, a broadcast message to the at least one idle mobile station, wherein the broadcast message is rebroadcast by the at least one idle mobile station;
    receiving, by the base station from the at least one idle mode mobile station, a registration response, the registration response includes registration information for the active mode mobile station; and
    establishing a communication with an active mode mobile station that is associated with the at least one idle mode mobile station, wherein the active mode mobile station is not able to directly receive communications from the base station, and wherein the identifying, selecting and establishing acts are performed by the base station, and wherein the broadcast message identifies the base station to allow the active mode mobile station to register with the base station, the registration response message is responsive to the broadcast message and the at least one idle mode mobile station is selected based on its proximity to the active mode mobile station.

2. The method of claim 1, further comprising the acts of:
    receiving, by the base station, an incoming call request for the active mode mobile station, wherein the communication is established in response to receipt of the incoming call request.

3. The method of claim 1, further comprising:
    receiving, by the base station from the active mode mobile station, a call request, wherein the communication is established in response to receipt of the call request.

4. The method of claim 1, wherein the at least one idle mode mobile station repeats communications between the base station and the active mode mobile station.

5. The method of claim 4, wherein the at least one idle mode mobile station includes two transceivers, a first transceiver supporting communications destined for the at least one idle mode mobile station and a second transceiver supporting communications destined for the active mode mobile station.

6. A system, comprising:
    a base station, comprising
        a memory; and
        a processor coupled to the memory, the processor including
            logic that identifies idle mode mobile stations supported by a base station;

logic that selects at least one of the idle mode mobile stations based on a location of the at least one idle mode mobile station; and logic that transmits a broadcast message to the at least one idle mobile station, wherein the broadcast message is rebroadcast by the at least one idle mobile station;

logic that receives a registration response from the at least one idle mode mobile station, the registration response includes registration information for the active mode mobile station; and logic that establishes a communication with an active mode mobile station that is associated with the at least one idle mode mobile station, wherein the active mode mobile station is not able to directly receive communications from the base station, and wherein the broadcast message identifies the base station to allow the active mode mobile station to register with the base station, the registration response message is responsive to the broadcast message and the at least one idle mode mobile station is selected based on its proximity to the active mode mobile station.

7. The system of claim 6, wherein the processor of the base station further comprises:
   logic that receives an incoming call request for the active mode mobile station, wherein the communication is established in response to receipt of the incoming call request.

8. The system of claim 6, wherein the processor of the base station further comprises:
   logic that receives a call request from the active mode mobile station, wherein the communication is established in response to receipt of the call request.

9. The system of claim 6, wherein the at least one idle mode mobile station repeats communications between the base station and the active mode mobile station.

10. The system of claim 9, wherein the at least one idle mode mobile station includes two transceivers, a first transceiver supporting communications destined for the at least one idle mode mobile station and a second transceiver supporting communications destined for the active mode mobile station.

11. The system of claim 6, wherein the base station further includes a memory.

12. A system, comprising:
   a base station, comprising
      a memory; and
      a processor coupled to the memory, the processor including
         logic that identifies idle mode mobile stations supported by a base station;
         logic that selects at least one of the idle mode mobile stations based on a location of the at least one idle mode mobile station; and
         logic that establishes a communication with an active mode mobile station that is associated with the at least one idle mode mobile station, wherein the active mode mobile station is not able to directly receive communications from the base station,
   wherein the at least one idle mode mobile station repeats communications between the base station and the active mode mobile station,
   wherein the at least one idle mode mobile station includes two transceivers, a first transceiver supporting communications destined for the at least one idle mode mobile station and a second transceiver supporting communications destined for the active mode mobile station, and
   wherein the first transceiver is coupled to a processor of the at least one idle mode mobile station via an upconverter/downconverter, and the second transceiver is coupled to the upconverter/downconverter, but arranged independent of the processor.

* * * * *